May 27, 1924.

L. A. WYLIE 1,495,626

CHECKROW WIRE GUIDE FOR CORN PLANTERS

Filed July 19, 1923

Inventor

Lloyd A. Wylie

By Alexander & Dowell

Attorneys

Patented May 27, 1924.

1,495,626

UNITED STATES PATENT OFFICE.

LLOYD A. WYLIE, OF ILLINOIS CITY, ILLINOIS.

CHECKROW WIRE GUIDE FOR CORN PLANTERS.

Application filed July 19, 1923. Serial No. 652,615.

*To all whom it may concern:*

Be it known that I, LLOYD A. WYLIE, a citizen of the United States, residing at Illinois City, in the county of Rock Island and State of Illinois, have invented certain new and useful Improvements in Checkrow Wire Guides for Corn Planters; and I hereby declare that the following is a full, clear, and exact description thereof, reference being had to the accompanying drawings, which form part of this specification.

This invention is a novel check row wire guide for corn planters and the like, and the object of the invention is to provide a novel device for guiding the check row wire as the same winds up upon the reel to cause said wire to wind up on the reel in even, perfect, and smooth layers, and is especially adapted for use with corn planters having an under slung reel for winding up the check row wire which is usually stretched across the field, said wire having a plurality of evenly spaced buttons thereon adapted to actuate the seed hopper valves to cause the valves to deposit the seeds at regular spaced intervals in the seed rows, and which is usually attached to a fixed object at the end of the field towards which the planter is advancing, the other end of the wire being attached to the reel which is driven from the planter axle to cause the reel to wind up the wire as the planter advances across the field.

By using my novel guide the necessity on the part of the operator of having to drive with one hand, using the other hand to mannally operate the usual guide control lever back and forth as the wire winds around the reel will be obviated, my novel guide being automatically operated by means of suitable gears or sprockets so designed that the wire will be wound on the reel in even, smooth layers, thus giving the operator the free use of both hands.

I will explain the invention with reference to the accompanying drawings which illustrate one practical embodiment thereof, to enable others to adopt and use the same, and summarize in the claims the novel features of construction and novel combinations of parts for which protection is desired.

Figure 1:
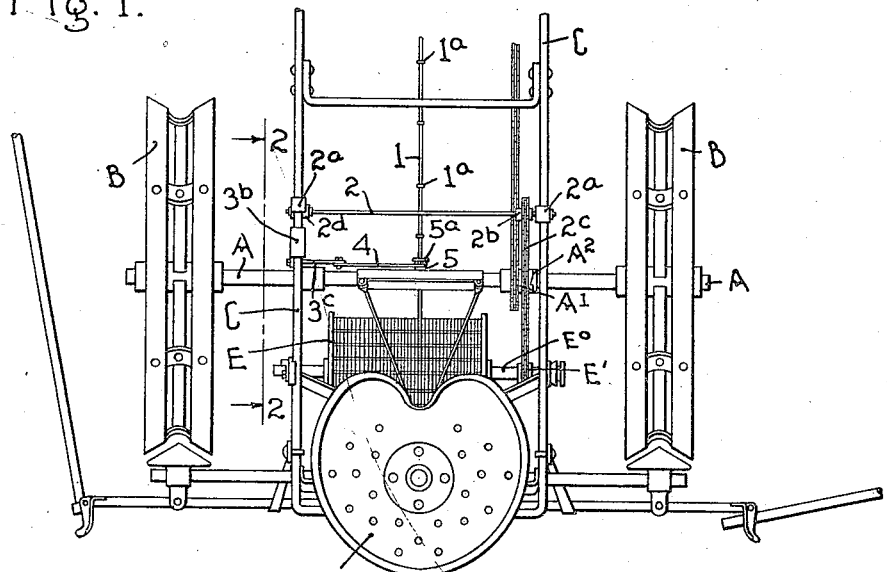
Fig. 1 is a top plan view of a corn planter of a well known type equipped with my novel check row wire guide.
Figure 2:
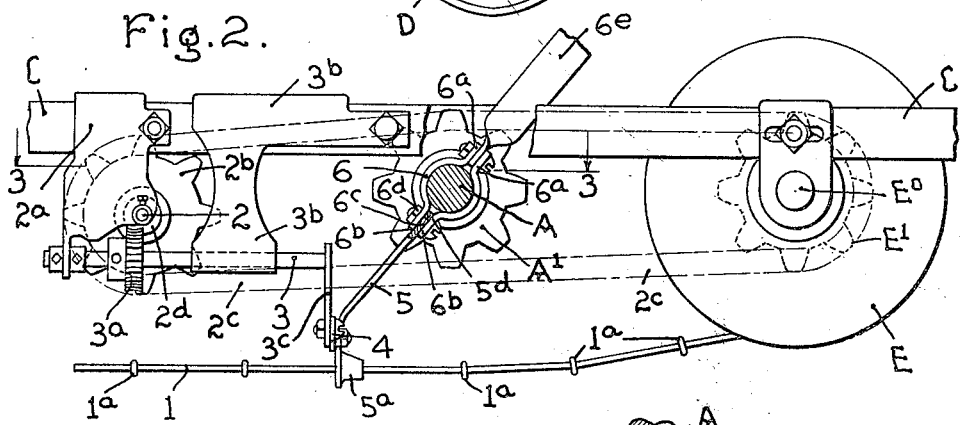
Fig. 2 is an enlarged detail section on the line 2—2, Fig. 1.
Figure 3:
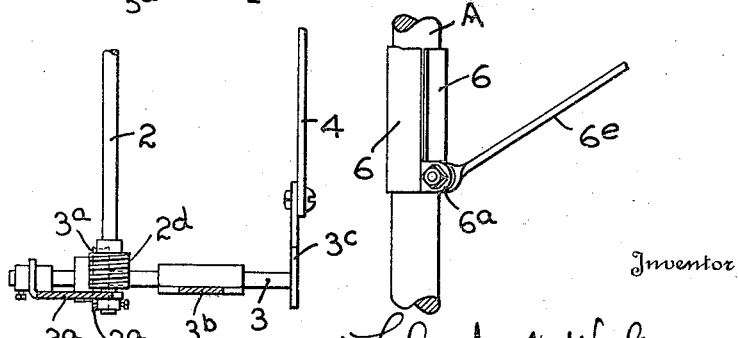
Fig. 3 is a detail section on the line 3—3 Fig. 2.

As shown in the drawings, my novel check row wire guide is illustrated in connection with a well known type of corn planter in which A is the axle on which the wheels B—B are keyed so as to cause the shaft A to rotate therewith. C is the frame of the planter, said frame being mounted on the axle A, and on the rear end of the frame C is securely attached the operator's seat D. Mounted in suitable bearings, below the frame C and at rear end thereof is the reel E mounted on a shaft $E^o$ and adapted to wind up the check row wire 1 as the planter advances over the field, said reel E being driven by means of a chain $2^c$ running over a sprocket wheel $E'$ on the reel shaft $E^o$ and over a sprocket wheel $A'$ on the axle A.

Mounted on the front end of the frame C are the usual seed hoppers (not shown) and their controlling valves, which valves are actuated by the check row wire 1 to intermittently drop seeds by means of the buttons $1^a$ attached to the wire 1 at regular intervals, one end of said wire 1 being securely attached to a fixed object at the end of the field towards which the planter is advancing, the other end thereof being attached to the reel E, which takes up the slack in the wire and winds up the wire on the reel as the planter advances, in the usual manner.

My novel guide is adapted to guide the check row wire as it winds upon the reel E so that the wire will automatically be wound upon said reel E in regular, even layers without requiring any manipulation of the parts thereof, by the operator, and comprises a shaft 2 rotatably mounted between the side frames C, C in front of the axle A, in suitable bearings $2^a$ hung from the side frames C, C and securely bolted thereto. Keyed to the shaft 2, adjacent one of the side frames C is a sprocket wheel $2^b$ driven from the axle A by means of a chain $2^c$ running over said sprocket $2^b$ and over a sprocket $A'$ engaged with the axle A by means of suitable clutch mechanism $A^2$. Chain $2^c$ further runs over sprocket wheel $E'$ on reel shaft $E^o$ thereby causing shafts 2 and $E^o$ to rotate with the axle A, said sprockets $2^b$, $A'$ and $E'$ being of such diameters as to cause the shafts 2 and E⁰ to rotate in proper timed relation and speed with respect to the axle A. As above stated sprocket wheel A′ is connected through clutch mechanism A² with the axle A, so that when the clutch lever (not shown) is thrown to engage the clutch members the chain 2ᶜ will cause shafts 2 and E⁰ to rotate with the axle A, and when the clutch members are disengaged the axle A alone will rotate.

On the opposite end of shaft 2 is keyed a worm gear 2ᵈ, adapted to mesh with and to drive a gear 3ª mounted on a shaft 3, which shaft is mounted in a suitable bearing bracket 3ᵇ hung from and bolted to the side frame C adjacent and to the rear of bracket 2ª, shaft 3 being disposed at right angles to the shaft 2, as shown. The forward end of shaft 3 is preferably supported in a suitable bearing in the lower end of bracket 2ª, as shown.

On the rear end of shaft 3, is securely attached an arm 3ᶜ, to the outer end of which is pivotally mounted a bar 4 in such manner that as the arm 3ᶜ revolves the bar 4 will be reciprocated transversely of the shaft 3.

The inner end of bar 4 is attached to a lever 5, the upper end of which lever is swingably suspended from the axle A, as hereinafter described, the lower end of said lever 5 being shaped to form a funnel shaped eye or loop 5ª through which the wire 1 passes prior to being wound on the reel, said loop 5ª being adapted to guide the wire 1 as it is wound on the reel E, and said loop 5ª being so designed that the buttons 1ª of wire 1, passing through said loop 5ª will not bind therein. The loop 5ª should preferably be relatively much larger than the buttons 1ª. Wire 1 is passed through the loop 5ª as it is being wound on the reel E, said lever 5 with loop 5ª being rocked by the reciprocating bar 4, as above described, in timed relation to the speed of the planter and the loop 5ª will cause the wire passing therethrough to be wound on the reel in perfect, even, and smooth layers.

My means for swingably suspending the lever 5 from the axle A, preferably comprises a split collar 6 of suitable length and diameter, the halves of which collar having perforated complemental flanges 6ª at each end thereof adapted to be bolted together around the axle A through said flanges 6ª, said collar 6 being non-rotatably but loosely mounted around said axle A so as not to cause binding thereof. At the lower center of said collar 6 are two complemental flanges 6ᵇ, preferably one on each half, through which flanges 6ᵇ is a hole 6ᶜ adapted to receive a bolt 6ᵈ, passing therethrough and through a hole 5ᵈ in the upper end of swingable lever 5.

I preferably center the collar 6 around the axle A and prevent rotation thereof about the axle A by means of two brace bars 6ᵉ having their lower ends attached to the bolts which couple the halves of the collar 6 together the upper ends of said brace bars 6ᵉ being preferably bent inwardly and upwardly to meet a central support for the operator's seat D to which the upper ends thereof are securely bolted.

In order to adjust the swing of the lever 5 to suit different lengths and sizes of reels, the arm 3ᶜ, or bar 4, or both may have a series of holes through which the pivot bolt may be passed to adjust the extent of the swinging movement of said lever 5.

All the gears and sprockets of the device should be of such diameter that the swinging of the loop 5ª, is properly timed and in direct connection and operation with the gears of the planter so that the check wire 1 will be wound on the reel E in perfect and smooth layers.

My novel guide is simple and efficient, and can readily be adapted to various types of corn planters and the like, especially those having an underslung check row wire reel, and my invention obviates the necessity on the part of the operator of having to utilize one of his hands as the planter is advancing, to operate back and forth the usual hand lever now employed in most corn planters which controls the guide for winding the wire on the reel and my novel guide thus gives the operator the free use of both of his hands, and winds the wire on the reel in more even and perfect layers than can be done by the use of the usual hand levers.

What I claim is:

1. For a machine of the character specified having a reel adapted to wind up a wire as the machine advances, a pivoted wire guide, means for suspending said guide from the axle of the machine; and means mounted on and positively driven by said machine for oscillating said guide to cause the wire to be wound up in regular layers on the reel.

2. For a machine of the character specified having a reel for winding up a wire; a driven shaft mounted on the frame; an arm on said shaft; an oscillatory lever carrying a guide for the wire, means for suspending said lever from the axle of the machine; and a link connecting said lever to said arm whereby when said shaft is rotated the lever will be oscillated to cause the wire to be wound in regular layers on the reel.

3. For a machine of the character specified having a reel for winding up a wire; a driven shaft mounted on the frame; an arm on said shaft; an oscillatory lever carrying a guide for the wire, means for suspending said lever from the axle of the machine; a link connecting said lever to said arm whereby when said shaft is rotated the lever will be oscillated to cause the wire to be wound in regular layers on the reel, and means for regulating the extent of swing of the oscillating lever.

4. For a machine of the character specified having a reel for winding up wire; a sprocket on said reel; a shaft mounted on the frame, parallel with said reel; a sprocket on said shaft for driving the shaft and reel from the axle of the machine, said chain running over the sprockets on the reel and shaft and over a driving sprocket on said axle; a second shaft mounted on the frame, means for driving the second shaft from the first shaft, an arm on the second shaft; a lever having a guide for the wire; means for suspending said lever from said axle; and a link connecting said lever to said arm, whereby when said second shaft is rotated the lever will be swung from side to side to guide the wire to the reel.

5. For a machine of the character specified having a reel adapted to wind up a wire as the machine advances, a pivoted lever carrying a wire guide, and the means for suspending the lever from the axle of the machine, said means comprising a split collar adapted to fit around the axle and having perforated complemental flanges for the passage of bolts, and a central perforated flange for the reception of a bolt passing therethrough and through a hole in the upper end of said lever.

6. For a machine of the character specified having a reel for winding up wire; a sprocket on said reel; a shaft mounted on the frame parallel with said reel; a sprocket on said shaft; a chain for driving the shaft and reel from the axle of the machine, said chain running over the sprockets on said reel and shaft and over a driving sprocket on the said axle; a second shaft mounted on the frame, means for driving the second shaft from the first shaft, an arm on the second shaft; a lever having a guide for the wire; means for suspending said lever from said axle; a link connecting said lever to said arm, whereby when said second shaft is rotated the lever will be swung from side to side to guide the wire to the reel, and means for regulating the extent of swing of the lever.

7. For a machine of the character specified having a reel adapted to wind up a wire as the machine advances, a pivoted lever carrying a wire guide, and means for suspending the lever from the axle comprising a split collar adapted to fit around the axle and having perforated complemental flanges at each end thereof for the passage of bolts, and a central perforated flange for the reception of a bolt passing therethrough and through a hole in the upper end of said lever, and means for centering the collar on the axle.

8. For a machine of the character specified having a wire winding reel; a sprocket on said reel; a shaft mounted on the frame parallel with said reel; a sprocket on said shaft; a chain for driving said reel and shaft from said axle, said chain running over said sprockets on said reel and axle, and over a driving sprocket on said axle; clutch means for disengaging said driving clutch to prevent rotation of said shaft and reel with said axle; a second shaft mounted in the frame at right angles to said first shaft, gearing between said shafts, an arm on the second shaft; a lever having a wire guide; means for suspending said lever from said axle; and a link connecting said lever to the arm on said second shaft, whereby when said second shaft is rotated the lever will be swung from side to side.

9. For a machine of the character specified having a wire winding reel parallel with the axle of the machine; a sprocket on said reel, a shaft mounted on the frame parallel with said axle, a sprocket on said shaft, a chain for driving said reel and shaft from said axle, said chain running over said sprockets on said reel and axle, and over a driving sprocket on said axle; clutch means for disengaging said driving clutch to prevent rotation of said shaft and reel with said axle; a worm on said shaft; a second shaft mounted in the frame at right angles to the first shaft, a gear on said second shaft meshing with the worm on said first shaft, an arm on said second shaft; a lever having a wire guide thereon; means for suspending said lever from the axle; a link connecting said lever to the arm on said second shaft whereby when said second shaft is rotated the lever will be swung from side to side, and means for regulating the extent of swing of said lever.

10. For a machine of the character specified having a reel adapted to wind up a wire as the machine advances, a pivoted lever carrying a wire guide, and means for suspending the swinging lever comprising a split collar adapted to fit around said axle and having perforated complemental flanges for the reception of bolts for fastening the halves of said split collar together; a central perforated flange for the reception of a hinge bolt passing therethrough and through a hole in the upper end of said lever, and means for centering the collar on the axle and for preventing rotation of the same.

In testimony that I claim the foregoing as my own I affix my signature.

LLOYD A. WYLIE.